Patented Aug. 28, 1928.

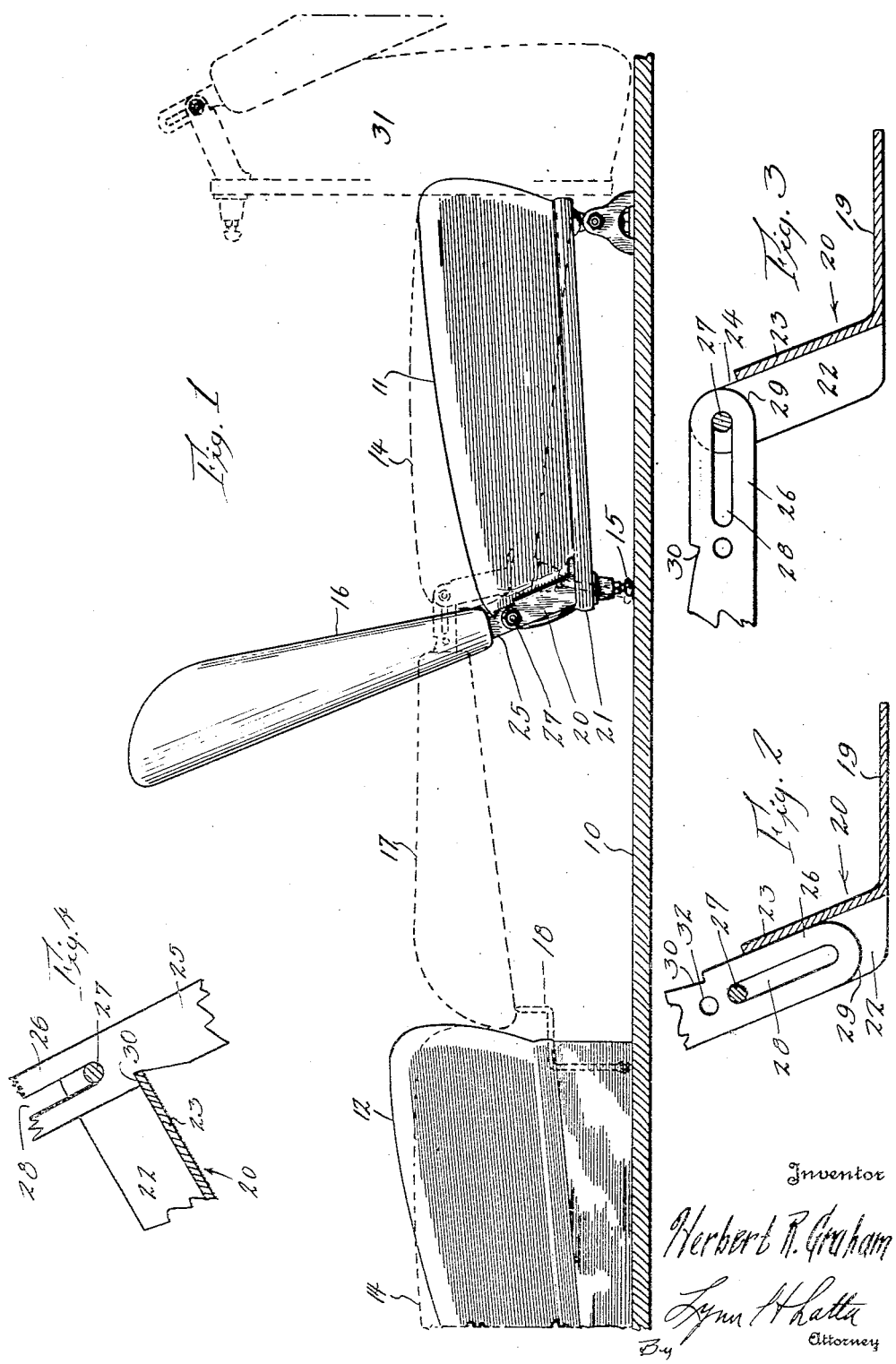

1,681,979

UNITED STATES PATENT OFFICE.

HERBERT R. GRAHAM, OF MILLER, SOUTH DAKOTA.

FRONT-SEAT CONSTRUCTION FOR AUTOMOBILES.

Application filed August 28, 1926. Serial No. 132,302. REISSUED

My invention relates to a front seat construction for automobiles of the same general type as that disclosed in my co-pending application, Serial Number 132,301. The object of the present invention is to provide a hinge to allow the front seat back of a vehicle, employing individual front seats, to be folded against the front cushion, or collapsed rearwardly to a horizontal position bridging the gap between front and back seats, the back being normally locked against said rearward movement, the hinge of the present invention being adapted to accomplish the above functions without the aid of spring pressure, it being only necessary to lift upon the back to unlock it for rearward movement.

More specifically, the hinge of the present invention embodies a pair of hinge members having a longitudinally telescoping movement from a position in which one of the hinge members is locked within the other against hinging movement except in one direction, to a position in which the hinge members may break in either direction from their normally aligned relation.

A further object of the invention is to provide means to prevent the hinge members assuming the above second mentioned position relative to each other when the back has been folded against the cushion.

With these and other objects in view, my invention consists in the arrangement and combination of the various parts of my device, whereby the objects contemplated are attained, as hereinafter more fully set forth, pointed out in my claims, and illustrated in the accompanying drawings, in which:

Fig. 1 is a longitudinal sectional view through the floor of a vehicle embodying my invention.

Fig. 2 is a vertical sectional view through the hinge with the parts in normally aligned relation and locked against the rearward movement of the back.

Fig. 3 is a similar view showing the parts in the positions assumed when the back has been collapsed rearwardly.

Fig. 4 is a similar view showing the parts in the positions assumed when the back has been folded against the cushions and the entire front seat folded against the dash of the vehicle.

In my companion application mentioned above, I have illustrated and described, in connection with a vehicle having a floor such is illustrated at 10 in the accompanying drawings, and having front and rear seat cushions as at 11 and 12, respectively of the said drawings, means for bringing said cushions to horizontal, aligned, positions as indicated in dotted lines at 13 and 14, respectively, in the accompanying drawings. The same means are employed in connection with the present invention, the rear seat cushion being reversed and the front seat cushion being raised by the extension of the adjustable legs 15, all as described in my other application. The front seat back 16 is adapted to be collapsed rearwardly to the position shown in dotted lines at 17, and to be there supported by a bracket 18, normally contained under the rear seat cushion, and movable to the position shown. The bracket 18 is identical with the bracket for the same purpose described in my companion application. I do not intend to claim, in the present application, any of the features enumerated above, but only the hinge, which I will now describe.

A bracket 19, having the upwardly and rearwardly inclined channel portion 20, is secured to the wooden frame 21 of the front seat. The channel portion 20 has the side plates 22 connected by a web, or forward wall 23, which is terminated short of the upper ends of the plates 23 to form a pair of ears 24.

The frame 25 of the back 16 is of the ordinary U shape, terminating in the portions 26, normally telescoped within the channel 20. A stud 27, secured between the ears 24, is received through the slot 28 of each portion 26, which latter allows the portion 26 to assume its normal telescoped position, as in Fig. 2, the engagement of the portion 26, below the stud 27, with the web 23, serving to lock the back against rearward movement. By simply lifting upon the back, the portion 26 will be drawn upwardly, its lower extremity being curved as at 29, concentric with the lower extremity of the slot 28, so that when the lower extremity of the slot engages the stud 27, there will be none of the portion 26 to swing forwardly, with the backward swing of the back 16, to engage the web 23.

The web 23 is terminated at a point below the stud 27 a longitudinal distance which is less than the lateral distance from the stud 27 to the inner face of the web 23, by the maximum depth of the notch 30 in the frame 25. Thus when the back 16 has been folded forwardly to the position shown in dotted lines in Fig. 1, at 31, the shoulder of the notch 30 will just clear the edge of the web 23 and will engage the inner face thereof, to lock the back against forward movement relative to the cushion 11. The back will then be held in the position shown at 31, and when the seat is swung to the floor again, there will be no possibility of the back swinging on to its then undersired rearward, reclined position. Inasmuch as the portion 26 can not telescope within its channel 20 until it has become aligned therewith, it will be seen that it would be very easy for the back to swing beyond normal position, were it being unfolded while the hinge members were in their separated relation.

If it is desired to lock the back permanently against rearward collapsing, the stud 27 may be removed and replaced through the hole 32 in the frame 25.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a front seat construction for vehicles, a seat frame, brackets secured to said frame and having upwardly and rearwardly inclined channels, each of said channels having side plates the forward extremities of which are connected by a web, said web being cut away to form projecting ears at the upper extremities of the side plates, a stud secured between said ears above the upper extremity of the web, a back frame having end portions received between the ears and normally telescoped within the channels, each end portion having a longitudinal slot receiving the stud and allowing withdrawal from telescoping relation to a position in which the end portion may hinge in either direction about the stud without contact with the web, the end portion engaging with the web when in telescoped relation, to lock the back frame against rearward movement.

2. In a front seat construction for vehicles, a seat frame, brackets secured to said frame and having upwardly and rearwardly inclined channels, each of said channels having side plates the forward extremities of which are connected by a web, said web being cut away to form projecting ears at the upper extremities of the side plates, a stud secured between said ears above the upper extremity of the web, a back frame having end portions received between the ears and normally telescoped within the channels, each end portion having a longitudinal slot receiving the stud and allowing withdrawal from telescoping relation to a position in which the end portion may hinge in either direction about the stud without contact with the web, the end portion engaging with the web when in telescoped relation, to lock the back frame against rearward movement, the upper extremity of the web being positioned to allow the back frame to fold forwardly toward the seat frame when the end portion is in telescoped position, and the end portion having a notched shoulder adapted to engage the web when the back frame is in its forwardly folded position, to prevent longitudinal movement of the end portion relative to its stud.

3. In a front seat construction for vehicles, a seat frame, brackets secured to the frame and having upwardly and rearwardly inclined members, studs secured in said members, a back frame having end portions provided with longitudinal slots receiving said studs, and allowing sliding movement of the end portions from normal relation projecting below the studs to a relation wherein they project above the studs, means engaging the projecting end portions when in normal relation to lock the back against rearward hinging, said means being positioned so as not to interfere with hinging movement of the back either forwardly or rearwardly when the back has been raised to bring the end portions to the second mentioned relation to the bracket members, the end portions being provided with notches to engage said means when the back is in a forwardly folded position and thereby prevent longitudinal movement of the end portions relative to their studs.

Signed this 21st day of August, 1926, at Sioux City, in the county of Woodbury and State of Iowa.

HERBERT R. GRAHAM.